(No Model.)
A. C. MERCER.
PHOTOGRAPHIC FINDER.
No. 565,626. Patented Aug. 11, 1896.
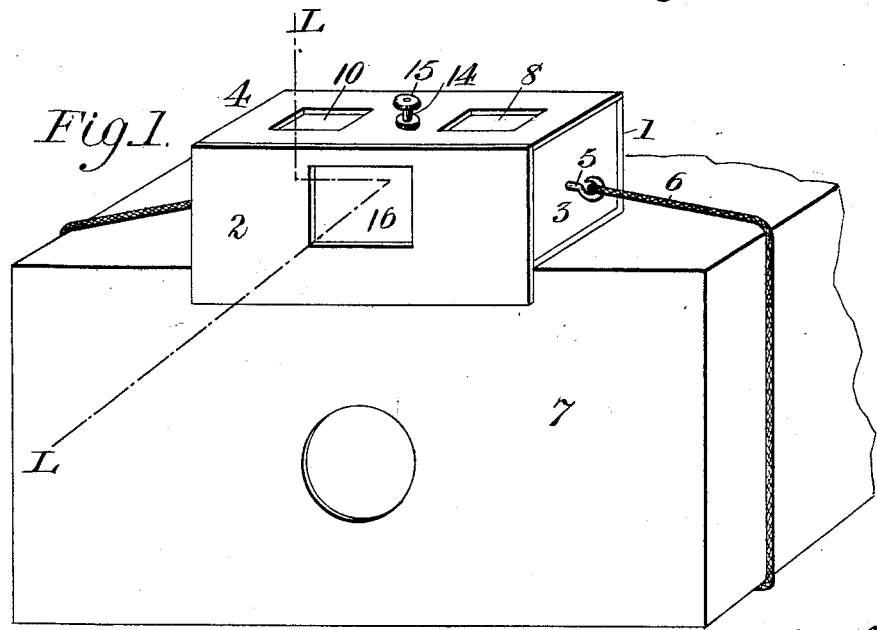
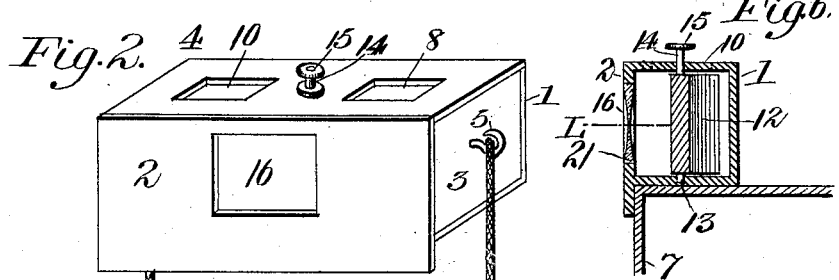
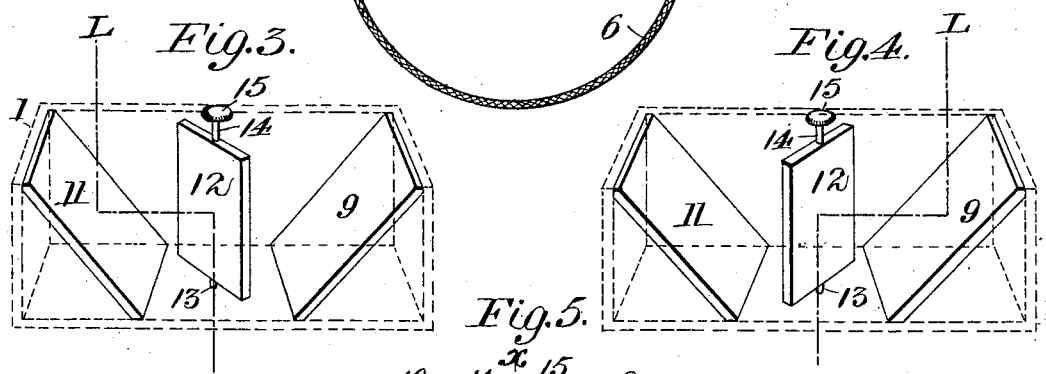
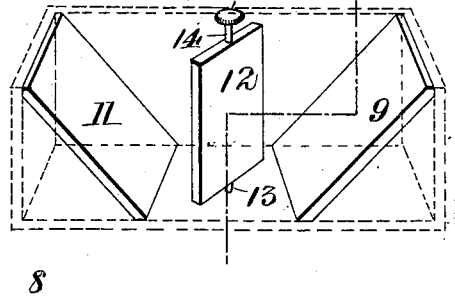
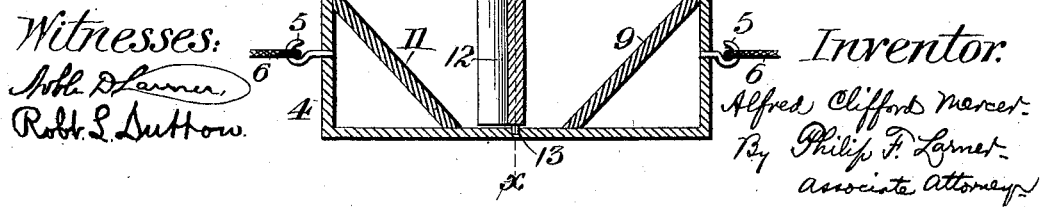
Witnesses: Inventor.
Alfred Clifford Mercer
By Philip F. Larner
associate attorney

UNITED STATES PATENT OFFICE.

ALFRED CLIFFORD MERCER, OF SYRACUSE, NEW YORK.

PHOTOGRAPHIC FINDER.

SPECIFICATION forming part of Letters Patent No. 565,626, dated August 11, 1896.

Application filed February 11, 1896. Serial No. 578,857. (No model.)

*To all whom it may concern:*

Be it known that I, ALFRED CLIFFORD MERCER, of Syracuse, in the county of Onondaga and State of New York, have invented certain new and useful Improvements in Photographic Finders, of which the following, taken in connection with the accompanying drawings, is a specification.

The object of my invention is to produce a photographic finder that can instantly and accurately be attached to any camera and detached therefrom and carried separately, and that, when so attached, will convey to the eye of the observer a reduced upright image of the object or view to be photographed, when the observer faces at right angles, either way, to the real direction of the view, in other words to the principal axis of his camera and its objective.

In the drawings, Figure 1 is a perspective view of my finder attached to a camera. Fig. 2 is the same detached. Fig. 3 is a perspective view of the mirrors, the box in which they are inclosed being shown by dotted lines. Fig. 4 is the same with the pivoted mirror in the reverse position. Fig. 5 is a middle vertical transverse section of the finder. Fig. 6 is a vertical longitudinal section on the line *x x* of Fig. 5.

I make an oblong box 1, allowing one of the sides 2 to project materially, so as to form a reëntrant angle with the adjacent side. In the ends 3 4 I screw eyes 5, to which I secure the ends of an elastic cord 6. I am thus enabled to attach the box 1 instantly and accurately (*i. e.*, so as to receive the same view that the camera itself does) to any desired part of any camera. In Fig. 1 it is shown as secured at the middle of the front edge of the camera-box 7. The projecting part of the side 2 fits over the edge, and the pull of the elastic cord or loop 6 coöperates to hold the finder in place nearly as solidly as if screwed on. Yet the finder may be instantly removed from, for instance, a camera covered with fine leather without leaving any marks or mars, and may be carried in the pocket for a preliminary selection of views. The elastic cord may be taken up by retying one end, so as to fit a very small camera, or to compensate for stretch after long use. In the box I cut three apertures, one, 16, in the middle of the front or side 2, and the other two, 8 10, in the top, near the two ends. Underneath the top aperture 8 I fix a mirror 9, its upper edge lying in the interior edge of the box formed by the top and end, and its lower edge resting on the bottom of the box, the mirror being inclined at an angle of forty-five degrees with the vertical.

It will be seen that if a source of light were placed in the center of the box it would be reflected by the mirror 9 up through the aperture 8 to the eye of the observer. Below the other top aperture 10 is fixed another mirror 11, exactly like the mirror 9 and placed exactly in the same position relative to its aperture.

It is to be especially noted that if, say, a candle were placed in the center of the box it would, while being simultaneously reflected up by the mirrors 9 and 11, appear to the observer in two different positions in the two mirrors. The flame end of the image would appear to be the farthest from the center of the box, and to see the image upright the observer would have to stand at one side of the camera in looking into one mirror and at the other side in looking into the other. He would, it will be perceived, have to stand at the side which the mirror he is using is farthest from. The same thing that is true of the image of the suppositious candle will be true of the image actually directed from the center of the box to the side mirrors 9 11, by the following means: In the front aperture 16 is fixed a negative lens 21, behind which is an upright mirror 12. This upright mirror is not fixed, like the others, but is pivoted by means of projections 13 14 from the center of its top and bottom edges. The bottom projection rests in a depression in the center of the bottom of the box, while its top projection passes through a corresponding hole in the center of the top of the box and is capped by a knob 15. I take care to place the bottom edges of the mirrors 9 and 11 so far apart that the mirror 14 may be completely rotated by turning the knob 15. Light L L from the object or view passes through the negative lens 21 in the front aperture 16 and falls upon the mirror 12. If that mirror be turned as in Fig. 3, so that it receives the light at an incident angle of forty-five degrees, it reflects that light to the mirror 11, whence the image is reflected up to the eye, as before explained; and if the mirror 12 be now rotated through a right angle, so that it stands as in Fig. 4, it will similarly direct the entering light to the eye by way of the mirror 9.

The use of my finder will now be readily perceived. Let us suppose that the operator wishes to photograph a person or scene without attracting attention. Having attached my finder to his camera, he has only to stand with his side toward the scene and look into the top aperture which is farthest from his body to see the scene in the aperture and to point his camera accurately and quickly at it. He may stand with either side toward the scene, directing the light from it through the corresponding top aperture by turning the pivoted mirror 12, as above described. In such circumstances it would be difficult approximately, and impossible accurately, to point a camera equipped with the ordinary form of finder. A similar situation arises where, in taking a view, one has to rest his camera on a ledge with a wall back of it, or where the camera is to be held out a front window and pointed up or down the street. He cannot then get behind the camera, so as to see the image from the ordinary finder upright.

I do not confine myself to the exact mode described of shifting the position of the mirror 12 from that of Fig. 3 to that of Fig. 4, as I consider the pivot and knob there shown a mere detail of mechanism for carrying out my idea of means.

What I claim as new and of my invention is—

1. A photographic finder composed of a box containing three mirrors, one of which rotates on a vertical axis behind a negative lens fixed in an opening in the front of the said box, and the other two of which are placed laterally, one on each side of the rotating mirror, inclined at an angle of forty-five degrees to said axis, at a right angle to each other and at an angle of forty-five degrees to and under openings in the top of the said box.

2. In a photographic finder, two lateral mirrors, placed at a right angle to each other, and a third mirror, revolving between the said lateral mirrors and behind a negative lens and capable of being turned toward either of the said lateral mirrors, at an angle of forty-five degrees to a line joining the centers of the said lateral mirrors, and at the same time at an angle of forty-five degrees to the said negative lens.

3. In a photographic finder, a rotating mirror receiving light through a negative lens from the object or view and reflecting the said light horizontally at right angles to its first course, and two other mirrors on opposite sides of the said rotating mirror either of which receives the said horizontally-reflected light, according as said rotating mirror is turned toward one or the other of the said side mirrors, and on receiving the said horizontal light reflects it at a vertical angle of forty-five degrees to the eye of the observer.

4. In a photographic finder, a mirror suitably supported behind, and at a horizontal angle of forty-five degrees to, a negative lens, the said mirror reflecting light coming from an object or view through the said negative lens, in a horizontal direction to a second mirror which second mirror reflects the said horizontal light at a vertical angle of forty-five degrees to the eye of the observer.

In testimony whereof I have signed my name to this specification, in the presence of two subscribing witnesses, on this 7th day of February, A. D. 1896.

A. CLIFFORD MERCER.

Witnesses:
IRVING A. SAVAGE,
EARL THOMPSON.